United States Patent [19]

Wu

[11] Patent Number: 5,392,607
[45] Date of Patent: Feb. 28, 1995

[54] STIRLING-CYCLE CYROGENIC COOLER USING ADAPTIVE FEEDFORWARD VIBRATION CONTROL

[75] Inventor: Yeong-Wei A. Wu, Rancho Palos Verdes, Calif.

[73] Assignee: Hughes Aircraft Company, Los Angeles, Calif.

[21] Appl. No.: 91,541

[22] Filed: Jul. 8, 1993

[51] Int. Cl.[6] .............................................. F25B 9/00
[52] U.S. Cl. .......................................... 62/6; 62/228.1;
364/165; 318/561; 318/646
[58] Field of Search ..................... 62/6, 203, 208, 209,
62/215, 226, 227, 228.1, 228.4; 236/78 D;
364/164, 165; 318/561, 567, 629, 648, 651, 686,
687, 611, 646

[56]    References Cited
U.S. PATENT DOCUMENTS

| | | | |
|---|---|---|---|
| 4,567,726 | 2/1986 | Vitale et al. | 62/6 X |
| 5,012,174 | 4/1991 | Adkins et al. | 318/648 X |
| 5,018,357 | 5/1991 | Livingstone et al. | 62/6 |
| 5,032,772 | 7/1991 | Gully et al. | 62/6 X |
| 5,156,005 | 10/1992 | Redlich | 62/6 |
| 5,245,830 | 9/1993 | Aubrun et al. | 62/6 |

*Primary Examiner*—Harry B. Tanner
*Attorney, Agent, or Firm*—Michael W. Sales; Wanda K. Denson-Low

[57]    ABSTRACT

A Stirling-cycle cryogenic cooler that employs a vibration control procedure based on adaptive feedforward principles. The vibration control procedure is particularly adapted for use as a spacecraft cryogenic cooler, and may be used to cool a detector array or other sensor located on the spacecraft. The vibration control procedure suppresses vibrational forces that occur during operation of the cooler. The cooler comprises an expander module and a compressor module. The expander and compressor modules employ separate motors that respectively drive an expander piston and a compressor piston, and a balancer piston is employed to dynamically balance the respective expander and compressor pistons. In the control procedure, current command signals are injected into a selected motor drive of either the compressor or expander module. The injected current command signals comprise higher-order harmonics with adaptively determined phases and amplitudes that provide for complete force cancellation in the cooler. The desired phases and amplitudes of the injected current command signals are estimated in real time using outputs of force sensors, such as load cells, coupled to the cooler housing that measure higher-order harmonic forces. In operation, when operational parameters of the cryogenic cooler have reached equilibrium, the harmonic content of its vibration force is very stable in time. Because of this unique characteristic, the phases and amplitudes of injected current command signal do not have to be determined quickly. Thus, the computation throughput required for the present control procedure are significantly reduced.

5 Claims, 6 Drawing Sheets

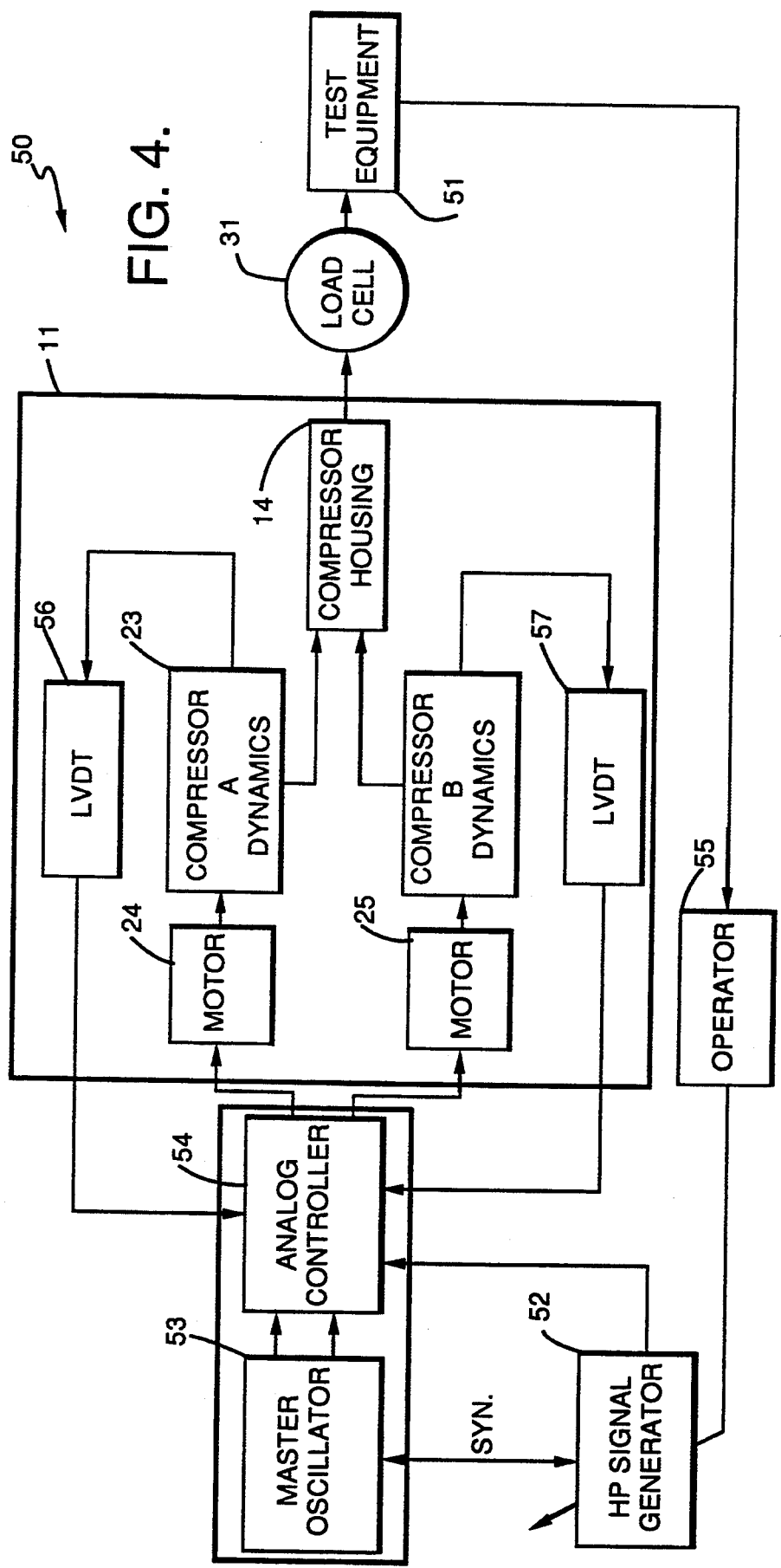

SECOND HARMONIC (72 Hz)

SIXTH HARMONIC (216 Hz)

STIRLING-CYCLE CYROGENIC COOLER USING ADAPTIVE FEEDFORWARD VIBRATION CONTROL

BACKGROUND

The present invention relates generally to Stirling-cycle cryogenic coolers, and more particularly, to a Stirling-cycle cryogenic cooler having an adaptive feedforward vibration control system and procedure and a spacecraft employing such a Stirling-cycle cryogenic cooler.

The assignee of the present invention designs and builds spacecraft employing infrared and other imaging sensors. These imaging sensors in general are cooled to very low temperatures (65° Kelvin) by cryogenic coolers. However, the coolers employ moving compressor and expander pistons that produce vibration that limits the performance of the imaging sensors. Consequently, vibration control systems and procedures have been developed to minimize the effects of vibration of the cryogenic cooler.

One narrow-band vibration control procedure has previously been developed by the assignee of the present invention that is adapted to reduce the vibration associated with Stirling-cycle cryogenic coolers employed on its spacecraft. However, it has been determined that the computational throughput required to implement this procedure is undesirably high. This computational inefficiency results in greater weight of the spacecraft, which is undesirable.

Therefore, it is an objective of the present invention to provide for an improved vibration control procedure for use with a Stirling-cycle cryogenic cooler. It is a further objective of the present invention to provide for a vibration control procedure for use with a Stirling-cycle cryogenic cooler that is computationally efficient in order to reduce the weight of the processors and components required to implement it.

SUMMARY OF THE INVENTION

In order to meet the above and other objectives, the present invention provides for an improved spacecraft and Stirling-cycle cryogenic cooler that employs a vibration control system and procedure based on adaptive feedforward principles. The present Stirling-cycle cryogenic cooler is particularly adapted for use as a spacecraft cryogenic cooler, such as in spacecraft manufactured by the assignee of the present invention, for example, and is adapted for use in cooling a detector array or other sensor located on the spacecraft. The present control system and procedure suppresses vibrational forces that occur during operation of the Stirling-cycle cryogenic cooler.

The Stirling-cycle cryogenic cooler comprises an expander module and a compressor module. The expander and compressor modules employ separate motors that respectively drive an expander piston and a compressor piston, and a balancer piston is employed to dynamically balance the respective expander and compressor pistons.

In the present control system and procedure, current command signals are injected into a selected motor drive of either the compressor or expander module. The current command signals may be injected into the motor drive of the balancer piston of the compressor or expander module, for example. The injected current command signals comprise higher-order harmonics with adaptively determined (adjustable) phases and amplitudes that provide for complete force cancellation in the cooler. The desired phases and amplitudes of the injected current command signals are estimated in real time using outputs of force sensors, such as load cells, mounted on the cooler housing that measure higher-order harmonic forces present in the cooler.

In operation, when operational parameters of the cryogenic cooler have reached equilibrium, the harmonic content of its vibration force is very stable in time. Because of this unique characteristic, the phases and amplitudes of injected current command signal do not have to be determined quickly. Thus, the computation throughput required for the present control procedure may be significantly reduced when compared to the narrow-band control procedure discussed above.

More particularly, and in one embodiment, the present invention comprises an adaptive feedforward vibration control procedure for use with a Stirling-cycle cryogenic cooler that comprises an expander module comprising an expander piston and a balancer piston that are each driven by respective motor drives, and a compressor module comprising an compressor piston and a balancer piston that are each driven by respective motor drives, and a force sensor coupled to the cooler that is adapted to measure higher-order harmonic forces present therein. The control procedure comprises the following steps. Measuring higher-order harmonic forces present in the cooler using the force sensor. Estimating phases and amplitudes of current command signals using the measured higher-order harmonic forces that are adapted to cancel the higher-order harmonic forces present in the cooler. Injecting higher-order harmonic current command signals having the estimated phases and amplitudes into a selected motor drive of either the compressor or expander module, which injected current command signals comprise higher-order harmonics having adaptively determined phases and amplitudes that provide for force cancellation in the cooler.

Another embodiment of the present invention is an adaptive feedforward vibration control system for use with a Stirling-cycle cryogenic cooler. The control system comprises a force sensor coupled to the cooler for measuring higher-order harmonic forces present therein, and estimating means for estimating phases and amplitudes of current command signals using measured higher-order harmonic forces provided by the force sensor that are adapted to cancel the higher-order harmonic forces present in the cooler. Signal generating means are coupled to the estimating means for injecting higher-order harmonic current command signals having the estimated phases and amplitudes into a selected motor drive of either the compressor or expander module. The injected current command signals comprise higher-order harmonics having adaptively determined phases and amplitudes that provide for force cancellation in the cooler.

Another embodiment of the present invention comprises a Stirling-cycle cryogenic cooler embodying the above adaptive feedforward vibration control system. Another embodiment of the present invention comprises a spacecraft including the Stirling-cycle cryogenic cooler and the adaptive feedforward vibration control system.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 4 shows a test setup used to verify the adaptive feedforward vibration control procedure in accordance with the principles of the present invention;

DETAILED DESCRIPTION

Figure 1:
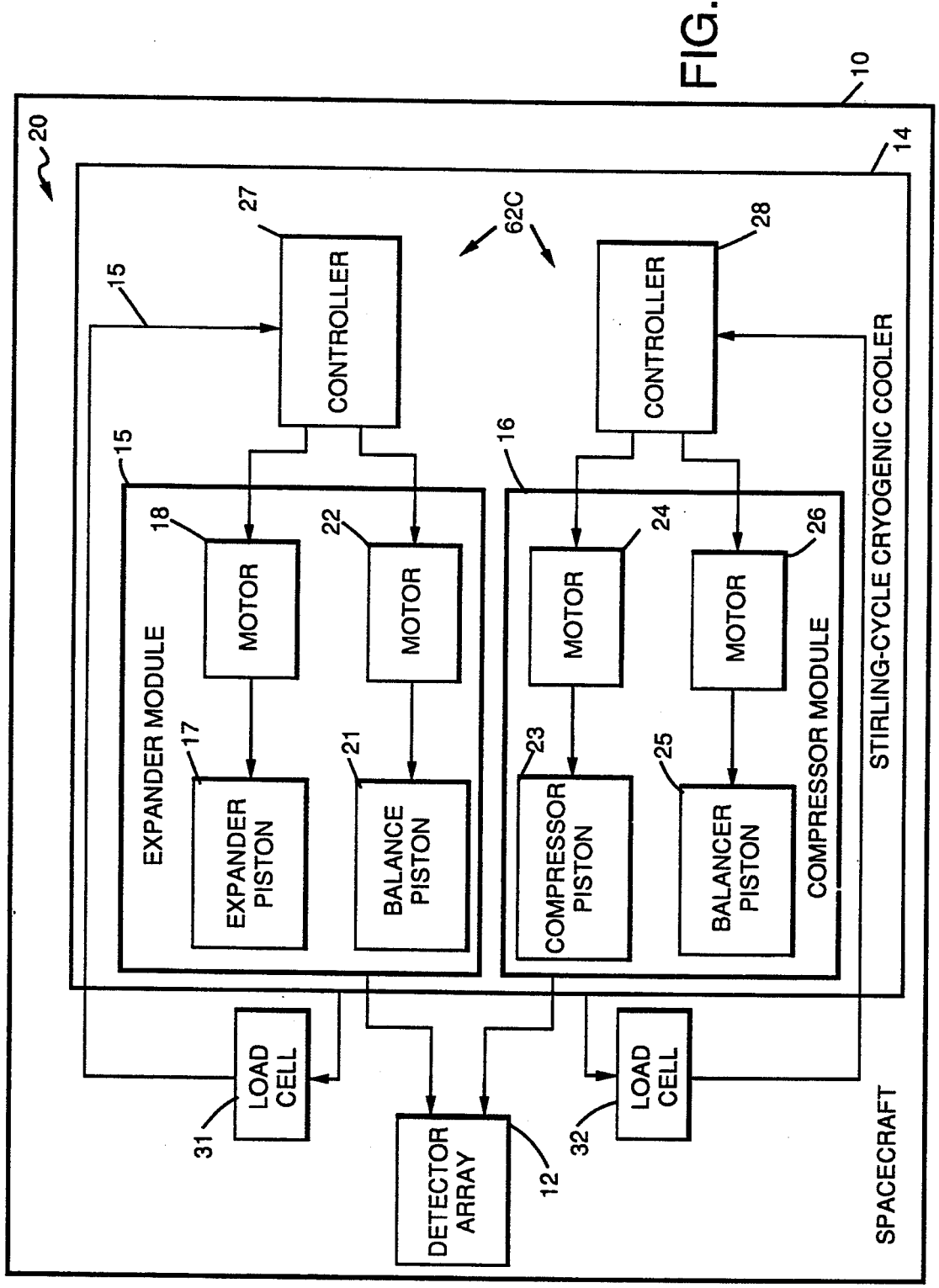
FIG. 1 shows a block diagram of a spacecraft employing a Stirling-cycle cryogenic cooler and imaging sensor that embodies an adaptive feedforward vibration control procedure in accordance with the principles of the present invention.

Referring to the drawing figures, FIG. 1 shows a block diagram of a spacecraft 10 employing a Stirling-cycle cryogenic cooler 11 and imaging sensor or detector array 12 that embodies an adaptive feedforward vibration control system 20 and procedure 40 in accordance with the principles of the present invention. The Stirling-cycle cryogenic cooler 11 includes a cooler housing 14, and an expander module 15 and a compressor module 16 disposed in the cooler housing 14. The expander module 15 is comprised of an expander piston 17 and its drive motor 18 and a balancer piston 21 and its drive motor 22. The compressor module 16 is comprised of a compressor piston 23 and its drive motor 24 and a balancer piston 25 and its drive motor 26.

The expander module 15 and the compressor module 16 are each coupled to respective controllers 27, 28 that comprise the adaptive feedforward vibration control system 20 and which are adapted to provide current command signals to the respective drive motors 18, 22, 24, 26 to control operation of the respective expander and compressor modules 15, 16. However, it is to be understood that the controllers 27, 28 may be implemented as a single controller or control system 20 that controls all motors 18, 22, 24, 26, if desired. Two load cells 31, 32 are respectively coupled between the cooler housing 14 and the controllers 27, 28 and are adapted to provide feedback signals thereto that are indicative of the vibration present in the cooler housing 14. The present adaptive feedforward vibration control procedure 40 is implemented in the respective controllers 27, 28 (the present adaptive control system 20) and will be described in more detail below.

Figure 2:
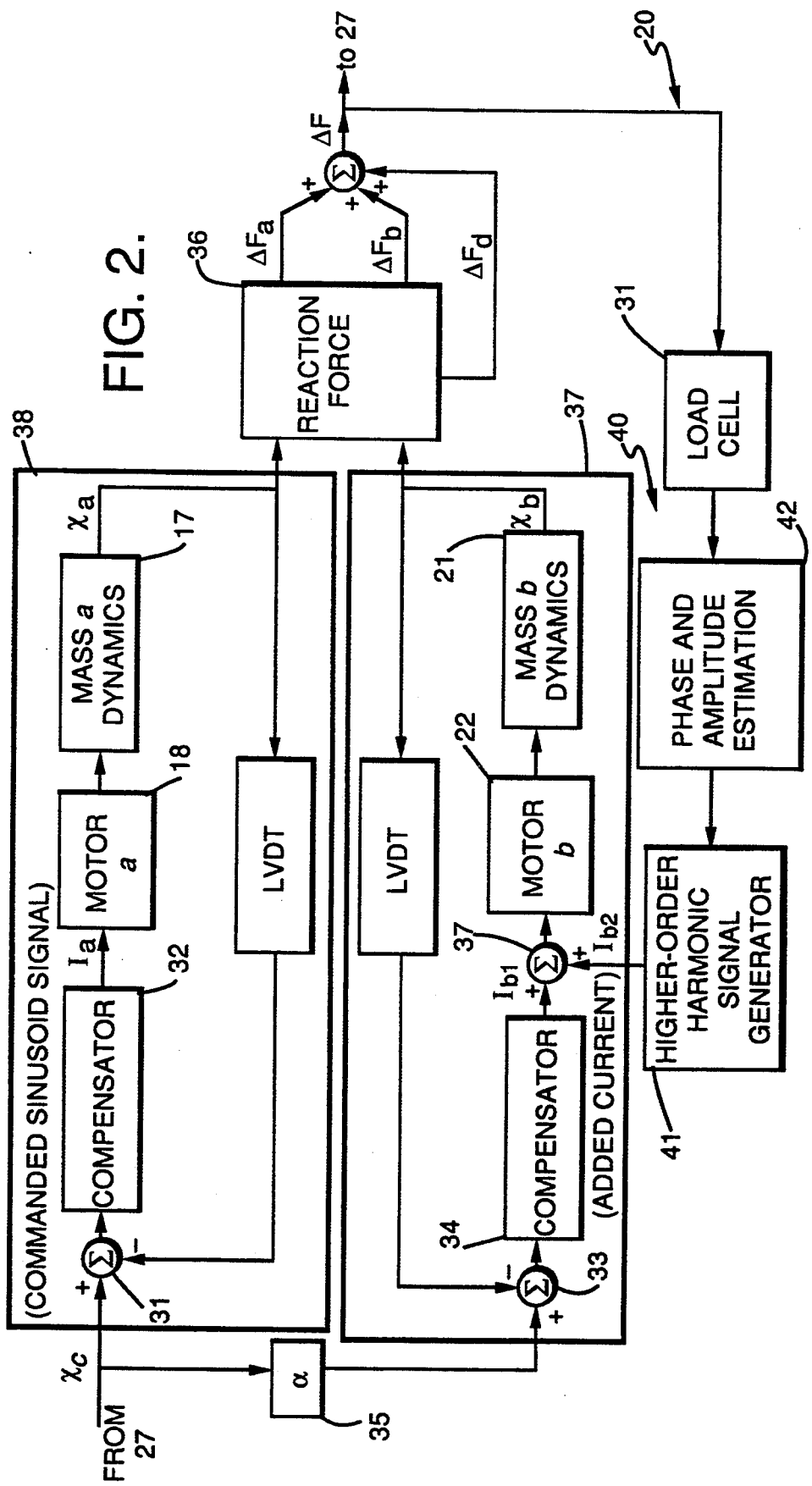
FIG. 2 is a block diagram illustrating vibration compensation in an expander module of a cryogenic cooler using position matching servos and employing the adaptive feedforward vibration control procedure in accordance with the principles of the present invention.

The adaptive control system 20 implemented in the respective controllers 27, 28 comprises the load cell 31, a phase and amplitude ($\phi_n$ and $I_n$) estimation means 42, and a higher order harmonic signal generator 41 that generates the desired current command signals, and which are coupled to the cooler in the manner shown in FIG. 2.

Referring to FIG. 2, it is a block diagram illustrating vibration compensation of the expander module 15 of the Stirling-cycle cryogenic cooler 11 implemented using position matching servos 38, 39 and employing the adaptive feedforward vibration control procedure 40 and control system 20 in accordance with the principles of the present invention. The compressor and expander modules 15, 16 of the Stirling-cycle cryogenic cooler 11 each have two moving assemblies: the compressor (or expander) piston 23, 17 and the respective balancer piston 26, 22. Two displacement transducers (LVDT) 56, 57 that are part of the position loop servos 38, 39 are coupled between the mass a and mass b dynamics 17, 21 and the summing devices 31, 33 for providing position feedback signals thereto.

The following discussion addresses the expander module 15, but it is to be understood that the same analysis applies to the compressor module 16 as well. During cryogenic operation, each moving piston 17, 21 is commanded, by way of a commanded reference signal $x_c$ derived from the controller 27, to follow a single-frequency sinusoidal motion (typically on the order of from 30 to 40 Hz). The commanded reference signal $x_c$ is coupled by way of a first summing device 31 and a compensator 32 to an input of the expander motor 18. The compensator 32 provides a current signal $I_a$ to the motor 18. A negative feedback signal is applied to the summing device from the output of the expander piston 17. The commanded reference signal $x_c$ is coupled by way of an adjustment means 35 ($\alpha$) and a second summing device 33 and a second compensator 34 to an input of the balancer motor 21. The single-frequency sinusoidal motion results in a reaction force 36 given by the equation $$F = -M\ddot{x} = -\Sigma F_i$$

where $F_i$ represents pressure forces, diaphragm spring forces, current leaf spring forces in the respective motor 18, 22, dissipative forces due to eddy current in the respective motor 18, 22, dissipative regenerator pressure drop forces, and electromechanical forces in the respective motor 18, 22, M is the mass of the motor 18, 22, and x is acceleration of the cooler housing 14. The total reaction force $\Delta F$ acting on the cooler housing 14 is then $$\Delta F = F_a + F_b = -M_a \ddot{x}_a - M_b \ddot{x}_b$$

where $x_a$ is the motion of mass a (the expander piston 17) and $x_b$ is the motion of mass b (the balancer piston 21) along an axial axis, and the mass properties of the respective masses of the pistons 17, 21 are given by $M_a$ and $M_b$. By knowing the two moving mass properties, $M_a$ and $M_b$, the motions (positions) $x_a$ and $x_b$ of the two pistons 17, 21 may be precisely controlled to obtain a zero reaction force 36 ($\Delta F$).

However, the motion of the expander and balancer pistons 17, 21 contain higher-order harmonics in addition to a fundamental drive frequency, due to nonlinearities in the motor drive electronics, piston suspension flexures, and gas thermodynamics, and the like. Hence, balancing the reaction force 36 at the fundamental drive frequency does not guarantee a zero reaction force at each of the higher-order harmonics. This is especially true in the expander module 15 due to the absence of pressure forces on the balancer piston 21.

Therefore, the total reaction force $\Delta F$ 36 may be expressed as $$\Delta F = \Delta F_f + \Delta F_h$$

where $\Delta F_f$ is the vibrational force occurring at the fundamental drive frequency and $\Delta F_h$ represents the residual higher-order harmonic forces. By adjusting the amplitude $a$ of the commanded reference signal $x_c$, the fundamental drive frequency force $\Delta F_f$ may be balanced or reduced to zero. As such, $\Delta F = \Delta F_h$.

If a current $I_{b2}$ is added to the balancer motor 22, for example, such as is derived by summing the current from the compensator 34 ($I_{b1}$) with the current $I_{b2}$ in a summing device 37, the net reaction force becomes $$\Delta F = \Delta F_h + \Delta F_d$$

where $\Delta F_d$ is the force induced by the added current $I_{b2}$. The vibration control system 20 and procedure 40 of the present invention generates the commanded input current $I_{b2}$ that is applied to the balancer motor 22, such that the net reaction force $\Delta F$ is driven to zero at all higher-order harmonic frequencies.

The present adaptive vibration control system 20 and procedure 40 produces a net zero reaction force and is derived below.

When driven by the sinusoid commanded reference signal $x_c$ that has a fundamental frequency $\omega = 2\pi f$, the resultant higher-order harmonic force has the following form after the position loop servos 38, 39 reach their steady state conditions:

$$\Delta F_h(t) = \sum_{n=2}^{N} F_n \sin(n\omega t + \alpha_n) \quad (1)$$

where $\alpha_n$ and $F_n$ are an unknown phase and amplitude of the $n^{th}$ harmonic frequency. If the injected motor current $I_{b2}$ contains the following higher-order harmonics with adjustable phases $\phi_n$ and amplitudes $I_n$:

$$I_{b2}(t) = \sum_{n=2}^{N} I_n \sin(n\omega t + \phi_n) \quad (2)$$

then the force induced by the added current becomes:

$$\Delta F_d(t) = \sum_{n=2}^{N} G_n I_n \sin(n\omega t + \phi_n + \psi_n) \quad (3)$$

where $\alpha_n$, $G_n$ and the corresponding phase and amplitude of the transfer function from the added current input to the measured force output. The vibration control system 20 and procedure 40 of the present invention adaptively determines values for $\phi_n$ and $I_n$ (in the phase and amplitude estimation means 42) such that:

$$\Delta F(t) = \sum_{n=2}^{N} F_n \sin(n\omega t + \alpha_n) + \sum_{n=2}^{N} G_n I_n \sin(n\omega t + \phi_n + \psi_n) \quad (4)$$

is equal to zero.

Given a set of values for $\phi_n$ and $I_n$ at time t, if the net force $\Delta F(t)$ measured by the load cell 31 (or force transducer) is not equal to zero, then equation (4) becomes:

$$\Delta F(t) = \sum_{n=2}^{N} F_n \sin(n\omega t + \theta_n) \neq 0. \quad (5)$$

By utilizing the following orthogonal properties of sine and cosine functions:

$$\frac{2}{T} \int_{-T/2}^{T/2} \sin(k\omega t)\sin(m\omega t)dt = 2 \text{ for } k = m;$$

$$\delta_{km} \text{ for } k \text{ and } m \neq 0$$

$$\frac{2}{T} \int_{-T/2}^{T/2} \cos(k\omega t)\cos(m\omega t)dt = 0 \text{ for } k \text{ and } m.$$

and multiplying both sides of equation (5) by these sine and cosine functions, the following equations are obtained after performing the integrations appearing on the right hand sides thereof:

$$B_n = \frac{2}{T} \int_{-T/2}^{T/2} \Delta F(t)\sin(n\omega t)dt = F_n \cos \alpha_n + G_n I_n \cos\tilde{\phi}_n. \quad (6)$$

$$C_n = \frac{2}{T} \int_{-T/2}^{T/2} \Delta F(t)\cos(n\omega t)dt = F_n \sin \alpha_n + G_n I_n \sin\tilde{\phi}_n. \quad (7)$$

with $$\tilde{\phi}_n = \phi_n + \Psi_n; \quad T = 1/f. \quad (8)$$

The quantities $B_n$ and $C_n$ provide a measure of the $n^{th}$ harmonic vibration component when the current estimated values for $\phi_n$ and $I_n$ are used. If the values for $\phi_n$, $I_n$ may be adjusted as follows at the next computation cycle with a small phase $\Delta\phi_n$ and a small amplitude $\Delta I_n$:

$$I_n(t+\Delta t) = I_n(t) + \Delta I_n \quad (9)$$

$$\phi_n(t+\Delta t) = \phi_n(t) + \Delta_n \quad (10)$$

and by correctly selecting $\Delta\phi_n$ and $\Delta I_n$, the values of $B_n$ and $C_n$ may be reduced to zero (plus second-order sine effects), thus producing a complete force cancellation at each harmonic frequency. These small phase and amplitude corrections may be obtained by performing the following three steps:

The first step is to perturb both sides of equations (6) and (7), and use the fact that $\Delta F_n = 0$; $\Delta \alpha_n = 0$; $\Delta \Psi_n = 0$; and $\Delta G_n = 0$:

$$\Delta B_n = (G_n \cos \tilde{\phi}_n)\Delta I_n - (G_n I_n \sin \tilde{\phi}_n)\Delta\phi_n \quad (11)$$

$$\Delta C_n = (G_n \sin \tilde{\phi}_n)\Delta I_n - (G_n I_n \cos \tilde{\phi}_n)\Delta\phi_n \quad (12)$$

The second step is to set $$\Delta B_n = B_n(t+\Delta t) - B_n(t) = -B_n(t) \quad (13)$$

$$\Delta C_n = C_n(t+\Delta t) - C_n(t) = -C_n(t) \quad (14)$$

The third step is to substitute equations (13), and (14) into equations (11) and (12) and solve for $\Delta\phi_n$ and $\Delta I_n$:

$$\Delta\phi_n = \frac{B_n(t)\sin\tilde{\phi}_n(t) - C_n(t)\cos\tilde{\phi}_n(t)}{G_n I_n(t)} \quad (15)$$

$$\Delta I_n = -\frac{B_n(t)\cos\tilde{\phi}_n(t) - C_n(t)\sin\tilde{\phi}_n(t)}{G_n}. \quad (16)$$

Equations (15) and (16) are the desired phase and amplitude corrections that reduce $B_n$ and $C_n$ to zero.

Figure 3:
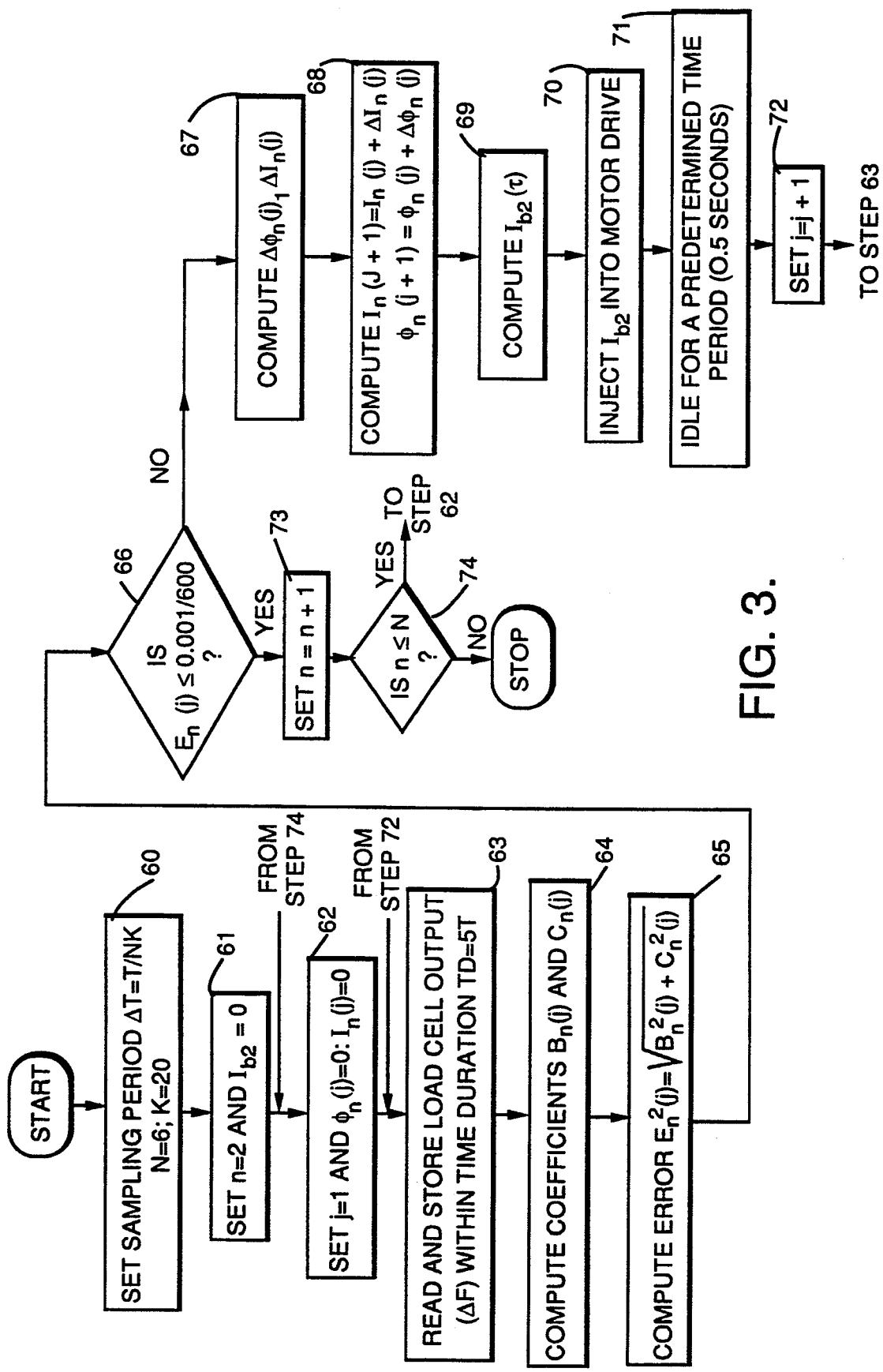
FIG. 3 is a process flow diagram that illustrates the details of the adaptive feedforward vibration control procedure in accordance with the present invention.

For the purposes of completeness, FIG. 3 is a process flow diagram that illustrates the details of the adaptive feedforward vibration control procedure 40 of the present invention and implemented in the control system 20 of FIG. 2 that has been reduced to practice. The procedure 40 comprises the following steps.

The first step 60 is to set the sampling period $\Delta T = T/Nk$ with $N=6$ (up to sixth harmonic) and $k=20$. The second step 61 is to set $n=2$ (second harmonic) and the initial added current $I_{b2}=0$. The third step 62 is to set the $j_{th}$ iteration $j=1$ and $\phi_n(j)=0$; $I_n(j)=0$. The fourth step 63 is to read and store the load cell output $\Delta F(i)$ for $i=1, 2, \ldots 60$, within a time duration $TD=5T$. The fifth step 64 is to compute the coefficients $B_n(j)$ and $C_n(j)$ given by $$B_n(j) = \frac{1}{600} \sum_{i=1}^{600} \Delta F(i)\sin(2n\pi fi\Delta T)$$

$$C_n(j) = \frac{1}{600} \sum_{i=1}^{600} \Delta F(i)\cos(2n\pi fi\Delta T).$$

The sixth step 65 is to compute the $n^{th}$ harmonic error $E_n(j)$ given by:

$$E_n(j) = \sqrt{B_n^2(j) + C_n^2(j)}.$$

The seventh step 66 is to check the error $E_n(j)$ such that if $E_n(j) \leq 0.001/600$, THEN The eighth step 67 is to compute the phase and amplitude corrections $$\Delta\phi_n(j) = \frac{B_n(j)\sin\tilde{\phi}_n(j) - C_n(j)\cos\tilde{\phi}_n(j)}{G_n I_n(j)}$$

$$\Delta I_n(j) = -\frac{B_n(j)\cos\tilde{\phi}_n(j) + C_n(j)\sin\tilde{\phi}_n(j)}{G_n},$$

with $\tilde{\phi}_n(j) = \phi_n(j) + \Psi n$.

The ninth step 68 is to compute the updated amplitude and phase $I_n(j+1)$ and $\phi_n(j+1)$:

$$I_n(j+1) = I_n(j) + \Delta I_n(j)$$

$$\phi_n(j+1) = \phi_n(j) + \Delta\phi_n(j).$$

The tenth step 69 is to compute the updated current $I_{b2}$:

$$I_{b2}(t) = \sum_{i=2}^{n} I_i(j+1)\sin(n\omega t + \phi_i(j+1)).$$

The eleventh step 70 is to inject the updated current $I_{b2}$ into the summing amplifier 37. The twelfth step 71 is to wait for a least one-half second. The thirteenth step 72 is to increment the number of the iteration: $j=j+1$, and return to the fourth step 63.

ELSE, The fourteenth step 73 is to increment the $n^{th}$ harmonic: $n=n+1$. The fifteenth step 74 is to check if is equal to N, and if n is greater than N, THEN, Stop the procedure; ELSE go back to the third step 62.

To illustrate the adaptive feedforward vibration control procedure 40 of the present invention and demonstrate its effectiveness for vibration suppression, a series of tests were conducted using an existing cryogenic cooler testbed 50 shown in FIG. 4. The testbed. 50 is comprised of a cryogenic cooler 11, associated test electronics 51, and power supplies (not shown). One of three load cells 31 mounted of the compressor housing 14 was connected to a Hewlett-Packard (HP) spectrum analyzer which is part of the test electronics 51. An HP signal generator 52, synchronized with a master oscillator 53 that produces a 36 Hz fundamental frequency drive signal, was used to generate the harmonic signal in an analog controller 54. The harmonic signal produced by the analog controller 54 was injected into a current amplifier of a selected compressor motor drive 24, 25. Two displacement transducers (LVDT) 56, 57 that are part of the position loop servos 38, 39 are coupled between the compressor dynamics 23, 26 and the controller 54 for providing position feedback signals for the respective servos 38, 39. For this particular test, the phase and amplitude of the injected harmonic signal was controlled by an operator 55 who monitored the output signal from the HP spectrum analyzer. By adjusting the phase and amplitude of the injected harmonic signal, it was demonstrated that the residual vibration of the cryogenic cooler 11 was suppressed to well below 0.01 Newton RMS.

Figure 5A:
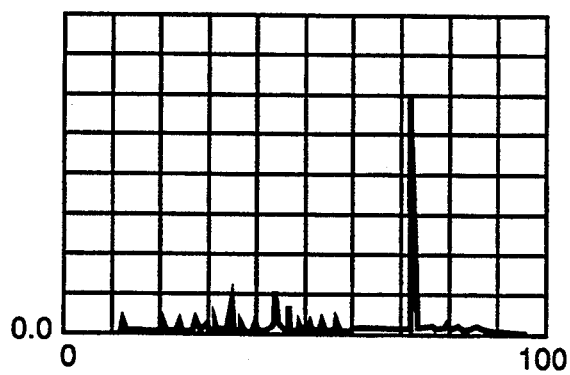
FIGS. 5a and 5b show vibration force spectra for the cryogenic cooler tested using the test setup of FIG. 4, having a second harmonic of 72 Hz.
Figure 5B:
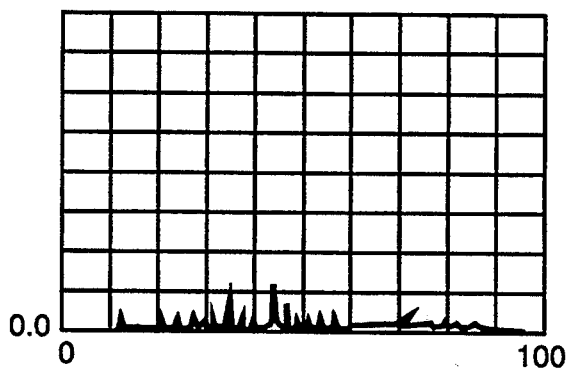
Figure 5C:
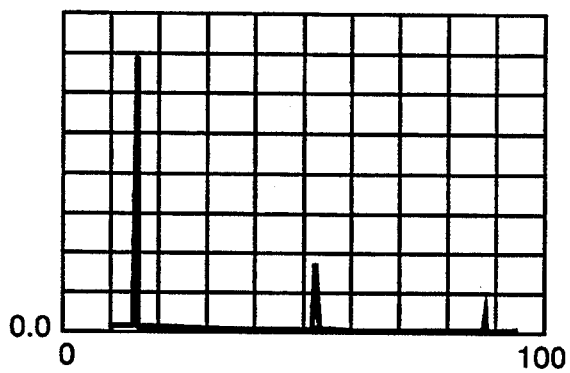
FIGS. 5c and 5d show vibration force spectra for the cryogenic cooler tested using the test setup of FIG. 4, having a sixth harmonic of 216 Hz.
Figure 5D:
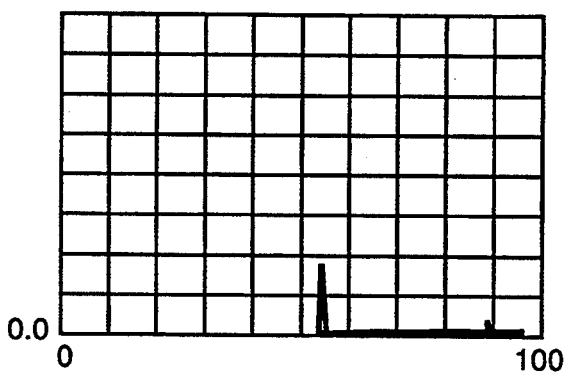

FIGS. 5a–5d illustrate the test results. FIGS. 5a and 5b show vibration force spectra for the cryogenic cooler 14 tested using the test setup of FIG. 4, having a second harmonic of 72 Hz, while FIGS. 5c and 5d show vibration force spectra for the cryogenic cooler 14, having a sixth harmonic of 216 Hz. From FIGS. 5a–5d, it can be seen that the present invention suppresses the residual harmonic forces to well below the required force level (0.01 Newton RMS).

In addition to the above-described hardware tests, a computer simulation model was developed to verify the developed iterative vibration control procedure 40 for estimating the unknown phases and amplitudes of the harmonic signals. The simulation model simulated the dynamic behavior of a given expander module 15 and the closed position loop servos 38, 39 as shown in FIG. 2, where the harmonic force vibration and the associated measurement noise were added to the output of the load cell 31. In the simulation setup, the injected second harmonic signal was added to the balancer channel for the purpose of complete force cancellation. The phase and amplitude of the second harmonic signal were updated every 0.15 seconds. Equations (9) (10), (15) and (16) were implemented using the load cell outputs sampling at a rate of 32 KHz to update the phase and amplitude estimates. A total of 400 samples per computation cycle was used in computing the coefficients $B_n$ and $C_n$ given by equations (6) and (7).

Figure 6A:
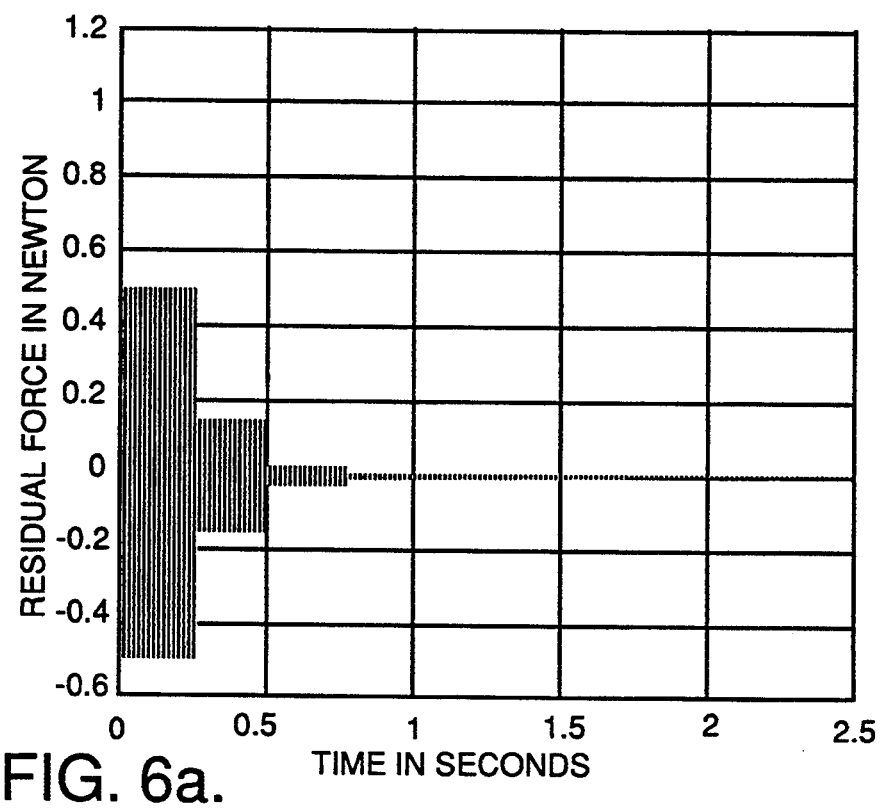
FIG. 6a shows the time response of residual force with a 20% error in both servo phase and amplitude using the adaptive feedforward vibration control procedure in accordance with the principles of the present invention.
Figure 6B:
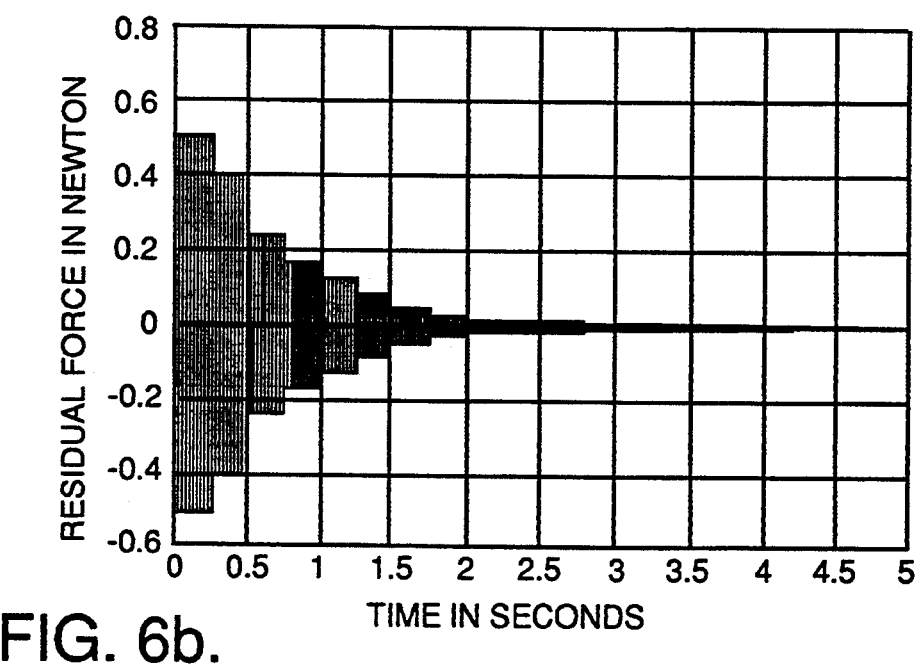
FIG. 6b shows the time response of residual force with an 80% error in both servo phase and amplitude using the adaptive feedforward vibration control procedure in accordance with the principles of the present invention.

FIG. 6a shows the simulation results of the residual second harmonic force vibration when the adaptive feedforward control procedure 40 was implemented with a 20% error in both transfer function gain $G_2$ and phase $\Psi_2$. FIG. 6b shows the resultant vibration suppression performance of the algorithm for the case with an 80% error in both transfer function gain $G_2$ and phase $\Psi_2$. The results clearly show the effectiveness of the present iterative vibration control procedure 40. It took less than 4 computational cycles (of less than 1 second) to reach the desired noise level (less than 0.01 Newton). As expected, the convergence time increases as the transfer function gain and phase errors increase (shown in FIG. 6b).

Thus there has been described a new and improved Stirling-cycle cryogenic cooler having an adaptive feedforward vibration control system and procedure and a spacecraft employing such a Stirling-cycle cryogenic cooler. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An adaptive feedforward vibration control procedure for use with a Stirling-cycle cryogenic cooler that comprises an expander module comprising an expander piston and a balancer piston that are each driven by respective motor drives, and a compressor module comprising an compressor piston and a balancer piston that are each driven by respective motor drives, and a force sensor coupled to the cooler that is adapted to measure higher-order harmonic forces present therein, wherein said control procedure comprises the steps of:

measuring higher-order harmonic forces present in the cooler using the force sensor;

estimating phases and amplitudes of current command signals using the measured higher-order harmonic forces that are adapted to cancel the higher-order harmonic forces present in the cooler; and injecting higher-order harmonic current command signals having the estimated phases and amplitudes into a selected motor drive of either the compressor or expander module, which injected current command signals comprise higher-order harmonics having adaptively determined phases and amplitudes that provide for force cancellation in the cooler.

2. The adaptive feedforward vibration control procedure of claim 1 which further comprises the steps of:

selecting a sampling period;

selecting a desired harmonic and an initial added current value;

setting iteration parameters;

and wherein the step of measuring higher-order harmonic forces comprises reading and storing reaction force values derived from the force sensor within a predetermined time duration;

and wherein the step of estimating the phases and amplitudes of the current command signals comprises computing coefficients indicative of a predetermined harmonic vibration component;

computing a predetermined harmonic error signal;

comparing the computed predetermined harmonic error signal to a predetermined value, and if the error signal is less than or equal to the predetermined value;

then:

computing phase and amplitude error correction values;

computing updated amplitude and phase values; and computing an updated current value;

injecting the updated current value into the selected motor drive;

waiting for a predetermined period of time;

incrementing the iteration value and then reading and storing new reaction force values;

otherwise:

incrementing the desired harmonic;

checking if n is equal to the selected higher order harmonic N, and if n is greater than N;

then:

stopping the procedure;

otherwise:

repeating the procedure by setting new iteration parameters and repeating the subsequent steps until the procedure is stopped.

3. A spacecraft comprising:

a spacecraft body;

a Stirling-cycle cryogenic cooler disposed on the body that comprises an expander module comprising an expander piston and a balancer piston that are each driven by respective motor drives, and a compressor module comprising an compressor piston and a balancer piston that are each driven by respective motor drives; and an adaptive feedforward vibration control system coupled to the spacecraft body and to the cooler that comprises:

a force sensor coupled to the cooler for measuring higher-order harmonic forces present therein;

estimating means for estimating phases and amplitudes of current command signals using measured higher-order harmonic forces provided by the force sensor that are adapted to cancel the higher-order harmonic forces present in the cooler; and signal generating means coupled to the estimating means for injecting higher-order harmonic current command signals having the estimated phases and amplitudes into a selected motor drive of either the compressor or expander module, which injected current command signals comprise higher-order harmonics having adaptively determined phases and amplitudes that provide for force cancellation in the cooler.

4. An adaptive feedforward vibration control system for use with a Stirling-cycle cryogenic cooler that comprises an expander module comprising an expander piston and a balancer piston that are each driven by respective motor drives, and a compressor module comprising an compressor piston and a balancer piston that are each driven by respective motor drives, said control system comprising:

a force sensor coupled to the cooler for measuring higher-order harmonic forces present therein;

estimating means for estimating phases and amplitudes of current command signals using measured higher-order harmonic forces provided by the force sensor that are adapted to cancel the higher-order harmonic forces present in the cooler; and signal generating means coupled to the estimating means for injecting higher-order harmonic current command signals having the estimated phases and amplitudes into a selected motor drive of either the compressor or expander module, which injected current command signals comprise higher-order harmonics having adaptively determined phases and amplitudes that provide for force cancellation in the cooler.

5. A Stirling-cycle cryogenic cooler comprising:

an expander module comprising an expander piston and a balancer piston that are each driven by respective motor drives, and a compressor module comprising an compressor piston and a balancer piston that are each driven by respective motor drives;

a force sensor for measuring higher-order harmonic forces present in the cooler;

estimating means for estimating phases and amplitudes of current command signals using measured higher-order harmonic forces provided by the force sensor that are adapted to cancel the higher-order harmonic forces present in the cooler; and signal generating means coupled to the estimating means for injecting higher-order harmonic current command signals having the estimated phases and amplitudes into a selected motor drive of either the compressor or expander module, which injected current command signals comprise higher-order harmonics having adaptively determined phases and amplitudes that provide for force cancellation in the cooler.

* * * * *